(12) United States Patent
Xiong et al.

(10) Patent No.: US 10,739,781 B2
(45) Date of Patent: Aug. 11, 2020

(54) CLIFF DETECTION METHOD, APPARATUS, AND TERMINAL DEVICE

(71) Applicant: UBTECH Robotics Corp, Shenzhen (CN)

(72) Inventors: Youjun Xiong, Shenzhen (CN); Gaobo Huang, Shenzhen (CN); Jiawen Hu, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 407 days.

(21) Appl. No.: 15/920,467

(22) Filed: Mar. 14, 2018

(65) Prior Publication Data

US 2019/0196493 A1    Jun. 27, 2019

(30) Foreign Application Priority Data

Dec. 26, 2017    (CN) .......................... 2017 1 1435033

(51) Int. Cl.
*G05D 1/02* (2020.01)
*G06T 7/00* (2017.01)

(52) U.S. Cl.
CPC ......... *G05D 1/0238* (2013.01); *G05D 1/0223* (2013.01); *G05D 1/0246* (2013.01); *G05D 1/0248* (2013.01); *G06T 7/00* (2013.01)

(58) Field of Classification Search
CPC .. G05D 1/0238; G05D 1/0248; G05D 1/0223; G05D 1/0246; G05D 1/0231; G05D 1/024; G05D 1/0251; G06T 7/00; G06T 7/254; G06T 2207/30261; G06T 7/74; G06T 2207/10028; G06T 7/77; G06T 1/0014; B25J 9/1666; B25J 9/1674; B25J 9/0003; B25J 9/1697; G01C 11/02; G01C 11/025

See application file for complete search history.

(56) References Cited

U.S. PATENT DOCUMENTS

2019/0079531 A1* 3/2019 Haegermarck ......... G01S 17/46

* cited by examiner

*Primary Examiner* — Adam R Mott (57) ABSTRACT

The present disclosure provides a method, apparatus, and terminal device for cliff detection. The method includes: obtaining a detection distance matrix of distances between a camera of a target robot and a ground within a preset detection angle range collected by the camera; obtaining a difference matrix obtained by subtracting a theoretical distance matrix from the detection distance matrix; counting an amount of elements in the difference matrix being greater than a preset first threshold; and determining a cliff is detected if the counted amount of the elements is greater than a preset second threshold. Through the overall consideration of the distance matrix of the distances within the detection angle range, even if a certain part of the ground changes its external conditions such as the color depth and the lightness, the influences on the overall detection result is extremely limited, which makes the detection result more accurate and reliable.

15 Claims, 6 Drawing Sheets

CLIFF DETECTION METHOD, APPARATUS, AND TERMINAL DEVICE

CROSS REFERENCE TO RELATED APPLICATIONS

This application claims priority to Chinese Patent Application No. 201711435033.9, filed Dec. 26, 2017, which is hereby incorporated by reference herein as if set forth in its entirety.

BACKGROUND

1. Technical Field

The present disclosure relates to robot technology, and particularly to a cliff detection method, apparatus, and terminal device.

2. Description of Related Art

Cliff detection means a test which a robot determines whether it came to the edge of the ground, so as to prevent the robot from falling from the edge of the ground. The robots of the prior art generally detects a particular location in front through an infrared distance sensor. The robot control system of the robots determines that whether to stop going forward or go around the hollow area in front basing on the detection result. In the detection method, since dark objects absorb more lights, the detection results will be largely changed with the change of external conditions, for example, the color depth and the lightness, of a certain part of the ground, which has poor reliability.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure, for those skilled in the art, other drawings can be obtained according to the drawings without creative efforts.

DETAILED DESCRIPTION

In order to make those skilled in the an better understand the solutions of the present disclosure, the technical solutions in the embodiments of the present disclosure will be described clearly below with reference to the accompanying drawings in the embodiments of the present disclosure. Apparently, the described embodiments are merely part of the embodiments of the present disclosure, but not all of the embodiments. All other embodiments obtained by those skilled in the art based on the embodiments of the present disclosure without creative efforts shall fall within the protection scope of the present disclosure.

Figure 1:
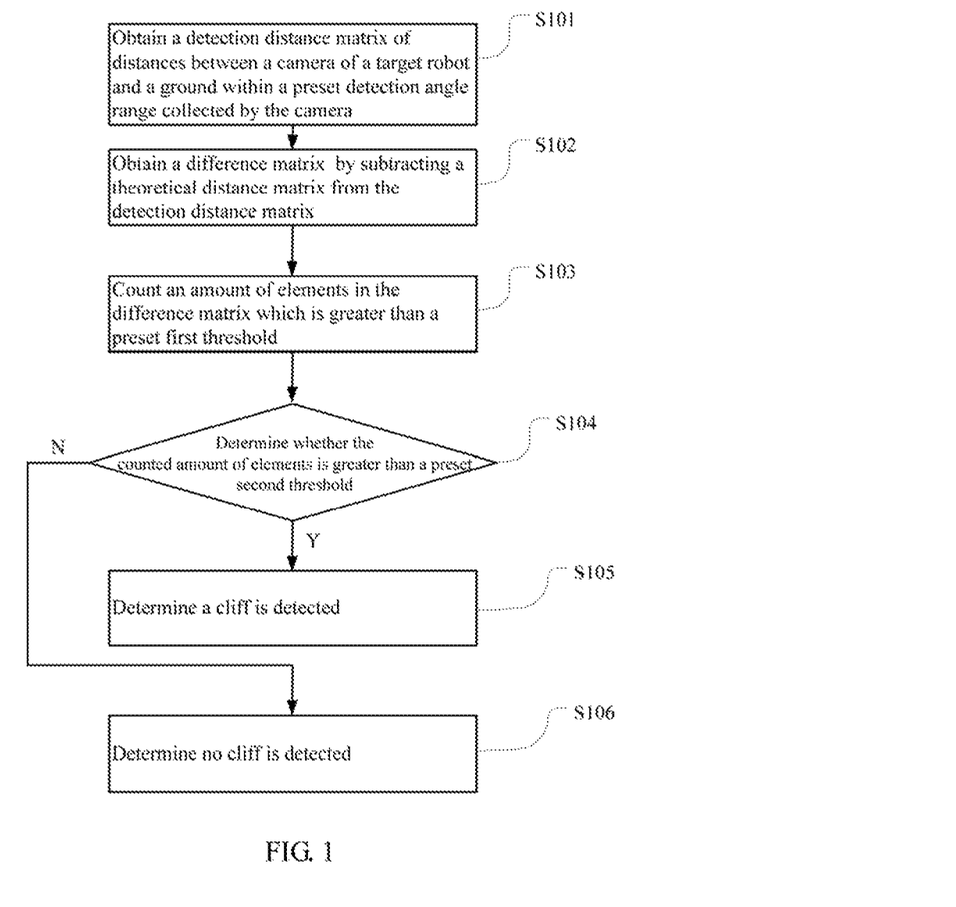
FIG. 1 is a flow chart of a cliff detection method according to an embodiment of the present disclosure.

FIG. 1 is a flow chart of a cliff detection method according to an embodiment of the present disclosure. In this embodiment, the method is a computer-implemented method executable for a processor. As shown in FIG. 1, the method includes the following steps.

S101: obtaining a detection distance matrix of distances between a camera 100 (see FIG. 3) of a target robot and a ground within a preset detection angle range collected by the camera 100.

In one embodiment, the camera 100 can be an RGBD depth camera. The images taken by the RGBD depth camera actually include two images: one is a normal RGB three-channel color image, while the other is a depth image. A depth image is similar to a grayscale image, except that each of its pixel values is the actual distance between the camera 100 and an object. Generally, the pixels in the RGB image and that in the depth image have a one-to-one correspondence.

In this embodiment, a complete distance matrix of distances between the camera 100 and a front obstacle within an entire visible angle range which is collected by the camera 100 is obtained first, and then a sub-matrix corresponding to the detection angle range is used as the detection distance matrix.

Figure 2:
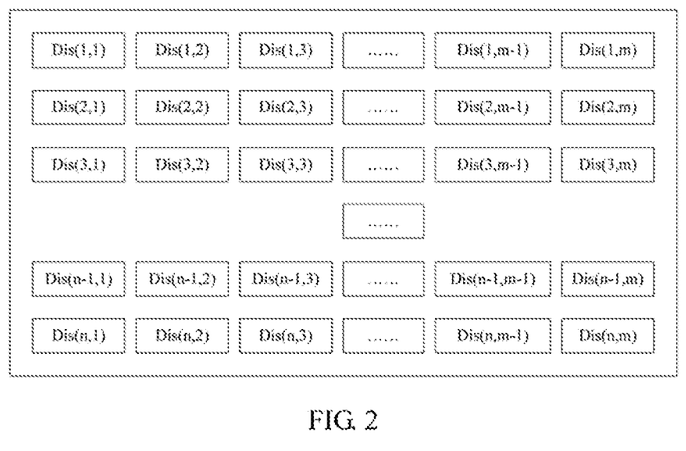
FIG. 2 is a schematic diagram of a complete distance matrix of distances between a camera and a front obstacle which is collected by the camera.

The visible angle range of the camera 100 is the range of angles which the camera 100 can detect in the horizontal and vertical directions. The camera 100 can collect the complete distance matrix of the distance between the camera 100 and the front obstacle in the entire visible angle range. That is, as shown in FIG. 2, the elements in the two-dimensional matrix are in a one-to-one correspondence with sampling angles in the visual angle range. It should be noted that each sampling angle is determined by one sampling angle in the horizontal direction and another sampling angle in the vertical direction. In this embodiment, n represents the amount of rows of the matrix, that is, the total amount of the sampling angles in the vertical direction, and m is the amount of columns of the matrix, that is, the total amount of the sampling angles in the horizontal direction. The elements in the matrix are the distance between the camera 100 and the front obstacle at a certain horizontal sampling angle and a certain vertical sampling angle, which can be expressed as Dis (u, v), where a indicates the row in which the element locates and has the value range of [1, n], and v is the column in which the element locates and has the value range of [1, m].

During the cliff detection, the distance between the camera 100 and the ground is used. Generally, for the complete distance matrix, only the elements of several rows below are the distances with respect to the ground, and the elements of several rows in above are the distances with respect to the ceiling or the front object. Therefore, it is not necessary to use all the elements in the complete distance matrix, but only needs to select the sub-matrix corresponding to the detection angle range from the complete distance matrix. For example, an included angle with respect to the horizontal plane can be used to represent the angle in the vertical direction. If the visible angle range of the camera 100 in the vertical direction is −30 degrees to 30 degrees while the detection angle range required by the cliff detection is −30 degrees to −20 degrees, and the detection angle range corresponds to the elements in the last three rows of the complete distance matrix, only the sub-matrix consisting of the elements in the last three rows needs to be selected as the detection distance matrix for the cliff detection, in which the elements in the detection distance matrix are in a one-to-one correspondence with the sampling angles within the detection angle range.

For a camera, the visible angle range is generally fixed, but the detection angle range selected for air detection can be set according to the actual situation so as to select one or more rows of elements which record the distances between the camera and the ground.

S102: obtaining a difference matrix by subtracting a theoretical distance matrix from the detection distance matrix.

The theoretical distance matrix is a pre-calculated distance matrix of distances between the camera 100 and a horizontal around within the detection angle range, which is calculated on an ideal ground condition of broadness and flatness which is without obstacles. The theoretical distance matrix and the detection distance matrix have the same amount of rows and columns, and the theoretical distance matrix provides an accurate comparison basis for performing cliff detection.

Preferably, the theoretical distance matrix may be calculated in advance by: obtaining a height of a center of the camera 100 from the ground and an included angle between an axis of the camera 100 and the ground; determining a plurality of sampling angles of the camera 100 within the detection angle range; and calculating the theoretical distance matrix according to the height of the center of the camera 100 from the ground, the included angle between the axis of the camera 100 and the ground, and the plurality of sampling angles.

In this embodiment, h is used to indicate the height of the center of the camera 100 from the ground, and $\varphi$ is used to indicate the included angle between the axis of the camera 100 and the ground. In this embodiment, for simplicity, only the case of $\varphi=0$, that is, the case in which the axis of the camera 100 is parallel to the ground is taken as an example.

Figure 3:
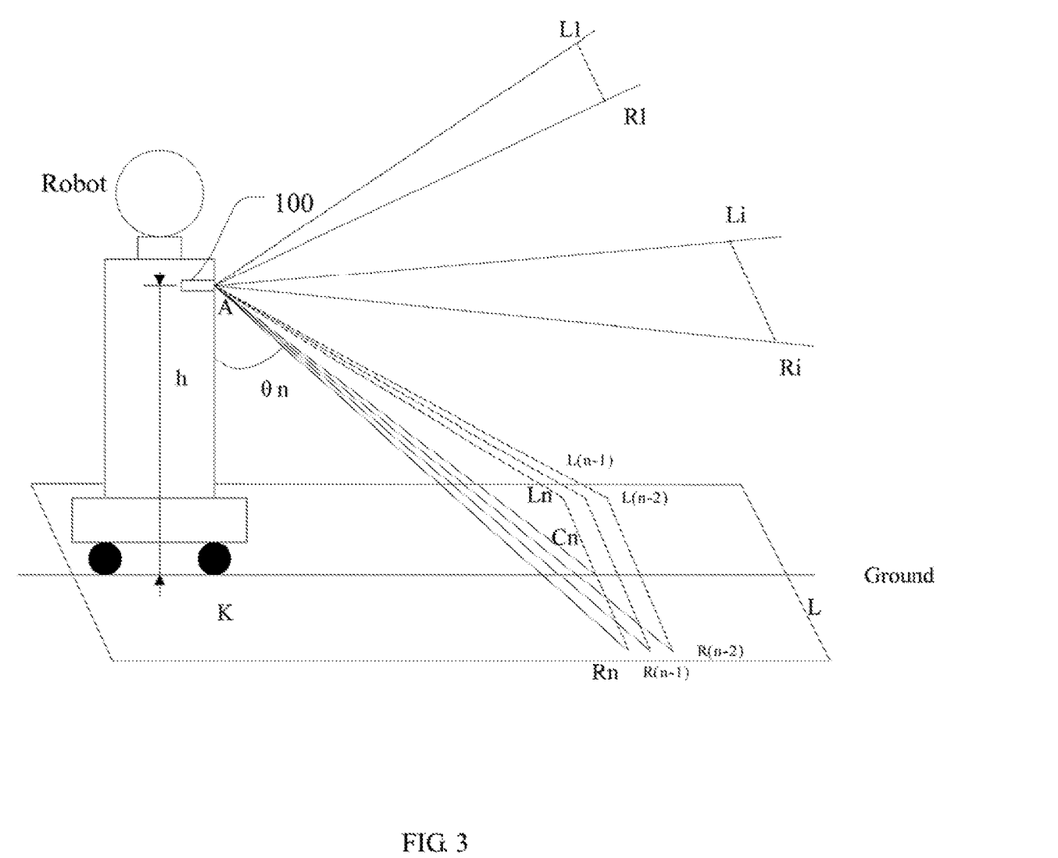
FIG. 3 is a schematic diagram of calculating a theoretical distance matrix.

FIG. 3 is a schematic diagram of calculating a theoretical distance matrix. As shown in FIG. 3, the left and right openings of the camera 100 is x degree, the upper and lower openings is y degree, the included angle between the center line of the lowermost cross section and the perpendicular line AK is $\theta_n=\pi/2-y/2$, the length of the center line ACn is the absolute value of $h/\cos \theta_n$, the included angle between the center line of i-th cross section and the (ground) perpendicular line AK is $\theta_i=(\pi-y)/2+y*i/(n-1)$, where $i \in 0, 1, \ldots, (n-1)$, the length of the center line ACi is the absolute value of $h/\cos \theta_i$.

Figure 4:
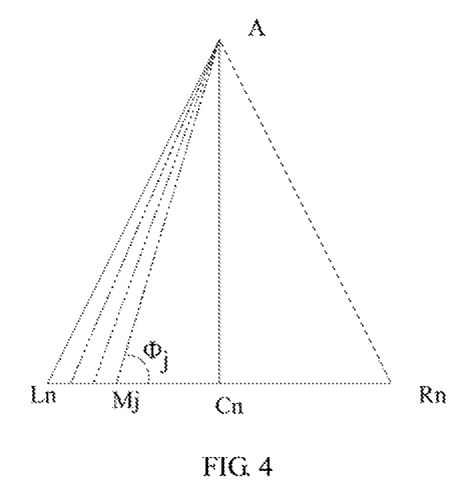
FIG. 4 is a schematic diagram of a typical measurement distance cross-section when calculating a theoretical distance matrix.

FIG. 4 is a schematic diagram of a typical measurement distance cross-section when calculating a theoretical distance matrix, which is a typical measurement distance cross-sectional view of FIG. 3, where the length value of ALn corresponds to Dis (n, 1) in FIG. 2, and the length of ARn corresponds to Dis (n, m) in FIG. 2. The point Mj is any point between Ln and Rn, and the included angle between AMj and LnRn is $\Phi_j=(\pi-x)/2+x*j/(m-1)$, where $j \in 0, 1, \ldots, (m-1)$. When j=0, the value of Mj is ALn; when j=m-1, the value of Mj if ARn. The distance of AMj, that is, the value of Dis (j, 1), is the absolute value of the length of ACn divided by sin $\Phi_j$, that is, the absolute value of $h/\cos \theta_n/\sin \Phi_j$. The distance value Dis (i, j) for any line on any cross-section i is the absolute value of $h/\cos \theta_i/\Phi_j$.

Preferably, after the difference matrix is obtained, the difference matrix may further be adjusted according to a preset coefficient matrix. Specifically, the difference matrix is dot multiplied by the coefficient matrix to obtain an adjusted difference matrix.

The coefficient matrix and the detection distance matrix have the same amount of rows and columns, in which the elements have a one-to-one correspondence with the sampling angles within the detection angle range, and the values of the elements in the coefficient matrix are determined according to the sampling angles corresponding to the elements. Generally, the sampling angles in the horizontal direction have no influence on the value, while the sampling angles in the vertical direction determine the specific value. Specifically, the two may be negatively related, that is, the smaller the sampling angle in the vertical direction which corresponds to a certain element is, the greater the value of the element is. On the contrary, the larger the sampling angle in the vertical direction which corresponds to a certain element is, the smaller the value of the element is. The reason for this setting is that the smaller the sampling angle in the vertical direction is, the closer the sampling point on the ground to the robot is, and the larger the value for reference is. By setting the coefficient matrix, different coefficient are used to weight different ground locations according to the distances (of ground locations), so that the obtained result can be more reasonable.

S103: counting an amount of elements in the difference matrix, which is greater than a preset first threshold.

The first threshold is a positive number, and is used to indicate the limit of the error between the actual distance and the theoretical distance. If a certain element in the difference matrix, is greater than the first threshold, it indicates that there is a sag on the ground in the corresponding detection angle. The specific value of the first threshold may be set according to the actual situation, which is not specifically limited in this embodiment.

S104: determining whether the counted amount of the elements is greater than a preset second threshold.

The second threshold is a positive number, and is used to indicate the limit of the amount of the sampling points for the sag within the detection angle range. If the amount of sampling points for the sag exceeds the limit, that is, if the amount of the counted elements is greater than the second threshold, step S105 is executed; if the amount of the counted elements is less than or equal to the second threshold, step S106 is executed.

S105: determining a cliff is detected

After detecting that there is a cliff in front, the movement of the target robot may further be controlled according to the counted amount of the elements. Specifically, if the counted amount of the elements is less than a preset third threshold, it moving speed of the target robot is adjusted, where the adjusted moving speed is negatively correlated with the counted amount of the elements; if the counted amount of the elements is greater than or equal to the third threshold, the target robot is controlled to stop moving, where the third threshold is greater than the second threshold. It can be easily understood that the smaller the amount of the elements to be counted is, the farther the target robot is away from the cliff area. In this case, the target robot may be slightly slowed down. The amount of the elements to be counted is getting greater while the target robot continuously approaching the cliff area, and the moving speed of the target robot should be continuously reduced. Until reaching a certain limit point, the target robot is braked to stop moving, thereby avoiding dropping from the cliff.

Optionally, after detecting that there is a cliff in front, the audio on the target robot may also be controlled to perform broadcast to alert the user.

S106: determining no cliff is detected.

If no cliff is detected, the target robot may be controlled to continue moving, and the above cliff detection process is continued.

As mention above, in this embodiment of the present disclosure, the detection distance matrix of the distances between the camera 100 of the target robot and the ground within the preset detection angle range collected by the camera 100 is obtained first, and then the difference matrix of the detection distance matrix and the corresponding theoretical distance matrix is calculated. Since the theoretical distance matrix is a pre-calculated distance matrix of the distances between the camera 100 and the horizontal ground within the detection angle range, which provides an accurate comparison basis for performing cliff detection. If the detection distance of a certain detection angle is greater than the theoretical distance, and the difference exceeds a certain threshold, it indicates that there is a sage on the ground within the detection angle. If this appears within multiple detection angles, that is, the amount of elements in the difference matrix which are greater than the preset first threshold is greater than the preset second threshold, it can be determined that there is a cliff area in front. Through the overall consideration of the distance matrix of the distances within the detection angle range, even if a certain part of the around changes its external conditions such as the color depth and the lightness, the influences on the overall detection result is extremely limited, which makes the detection result more accurate and reliable.

Figure 5:
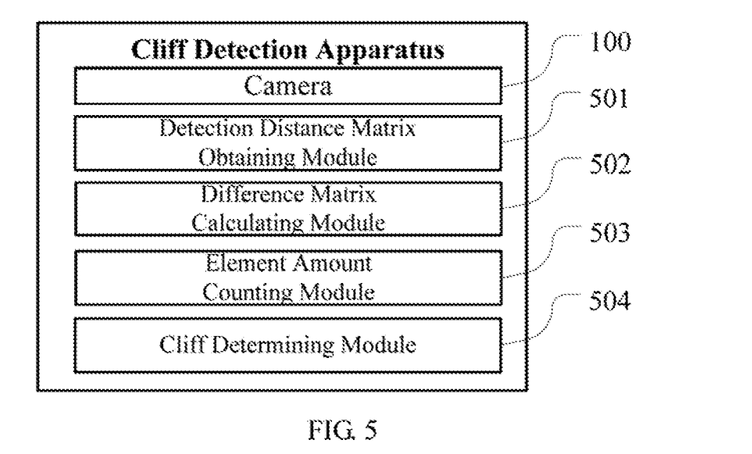
FIG. 5 is a schematic diagram of a cliff detection apparatus according to an embodiment of the present disclosure.

FIG. 5 is a schematic diagram of a cliff detection apparatus according to an embodiment of the present disclosure. As shown in FIG. 5, the apparatus may include a processor and a memory storing instructions executable for the processor, wherein the instructions function as:

a detection distance matrix obtaining module 501 configured to obtain a detection distance matrix of distances between a camera of a target robot and a ground within a preset detection angle range collected by the camera;

a difference matrix calculating module 502 configured to obtain difference matrix obtained by subtracting a theoretical distance matrix from the detection distance matrix, in which the theoretical distance matrix is a pre-calculated distance matrix of distances between the camera and a horizontal ground within the detection angle range;

an element amount counting module 503 configured to count an amount of elements in the difference matrix being greater than a preset first threshold; and a cliff determining module 504 configured to determine a cliff is detected if the counted amount, of elements is greater than a preset second threshold, in which both the first threshold and the second threshold are positive numbers.

Furthermore, the cliff detection apparatus may further include:

a camera information obtaining module configured to obtain a height of a center of the camera from the ground and an included angle between an axis of the camera and the ground;

a sampling angle determining module configured to determine a plurality of sampling angles of the camera within the detection angle range; and a theoretical distance matrix calculating module configured to calculate the theoretical distance matrix according to the height of the center of the camera from the ground, the included angle between the axis of the camera and the ground, and the plurality of sampling angles.

Furthermore, the cliff detection apparatus may further include:

a difference matrix adjusting module configured to dot multiply the difference matrix with a preset coefficient matrix to obtain an adjusted difference matrix, in which elements in the coefficient matrix are in a one-to-one correspondence with the sampling angles within the detection angle range, and the value of the elements in the coefficient matrix is determined according to the sampling angle corresponding to each of the elements.

Furthermore, the cliff detection apparatus may further include:

a speed adjusting module configure to adjust a moving speed of the target robot if the counted amount of elements is less than a preset third threshold, in which the adjusted moving speed is negatively correlated with the counted amount of elements; and a braking at configure to control the target robot to stop moving if the counted amount of elements is greater than or equal to the third threshold.

Furthermore, the detection distance matrix obtaining module 501 may include:

a complete distance matrix obtaining unit configured to obtain a complete distance matrix of distances between the camera and a front obstacle within an entire visible angle range collected by the camera; and a detection distance matrix selecting unit configured to select a sub-matrix corresponding to the detection angle range as the detection distance matrix.

Those skilled in the art may clearly understand that, for convenience and simplicity of description, the specific working processes of the above-mentioned apparatus and unit may refer to the corresponding processes in the above-mentioned method embodiments and details are not described herein.

It should be understood that, the number of inch step in each of the above-mentioned embodiments does not mean the sequence of execution. Instead, the execution sequence of each process should be determined by its function and inherent logic, and should not constitute any limitation on the implementation process of the embodiments of the present disclosure.

Figure 6:
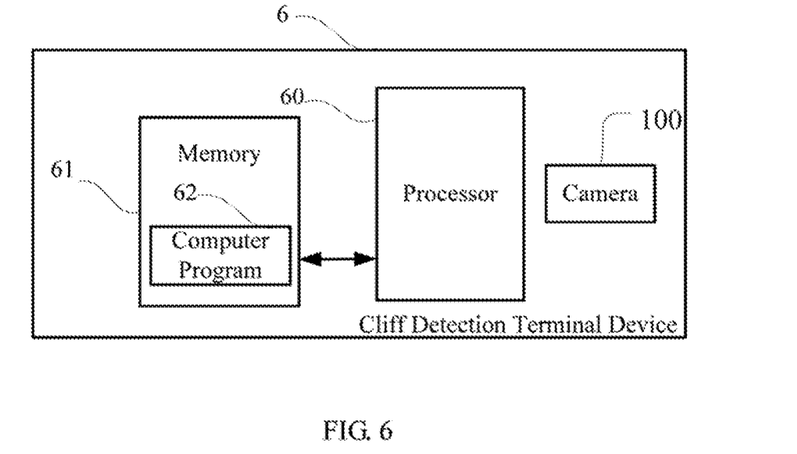
FIG. 6 is a schematic diagram of a cliff detection terminal device according to an embodiment of the present disclosure.

FIG. 6 is a schematic diagram of a cliff detection terminal device according to an embodiment of the present disclosure. As shown in FIG. 6, the cliff detection terminal device 6 of this embodiment includes a processor 60, a memory 61, and a computer program 62 stored in the memory 61 and executable on the processor 60. When executing (instructions in) the computer program 62, the processor 60 implements the steps in the above-mentioned embodiments of the cliff detection method, for example, steps S101 to S106 shown in FIG. 2. Alternatively, when the processor 60 executes the (instructions in) computer program 62, the functions of each module/unit in the above-mentioned device embodiments for example, the functions of the modules 501 to 504 shown in FIG. 5 are implemented.

Exemplarily, the computer program 62 may be divided into one or more modules/units, and the one or more modules/units are stored in the storage 61 and executed by the processor 60 to realize the present disclosure. The one or more module/units may be a series of computer program instruction sections capable of performing a specific function, and the instruction sections are for describing the execution process of the computer program 62 in the cliff detection terminal apparatus 6. For example, the computer program 62 may be divided into a detection distance matrix obtaining module, a difference matrix calculating module, an element amount co tinting module, and a cliff determination module.

The cliff detection terminal device 6 may be a computing device such as a desktop computer, as notebook computer, a tablet computer, and a cloud server. The cliff detection terminal device 6 may include, but is not limited to, a processor 60 and a storage 61. It can be understood by those skilled in the art that FIG. 6 is merely an example of the cliff detection terminal device 6 and does not constitute a limitation on the cliff detection terminal device 6, and may include more or fewer components than those shown in the figure, or a combination of some components or different components. For example, the terminal device may further include an input/output device, a network access device, a bus, and the like.

The processor 60 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 61 may be an internal storage unit of the cliff detection terminal device 6, for example, a hard disk or a memory of the cliff detection terminal device 6. The storage 61 may also be an external storage device of the cliff detection terminal device 6, for example, a plug-in hard disk, a smart media card (SMC), a secure digital (SD) card, flash card, and the like, which is equipped on cliff detection terminal device 6. Furthermore, the storage 61 may further include both an internal storage unit and an external storage device, of the cliff detection terminal device 6. The storage 61 is configured to store the computer program and other programs and data required by the cliff detection terminal device 6. The storage 61 may also be used to temporarily store data that has been or will be output.

Those skilled in the art may clearly understand that, for the convenience and simplicity of description, the division of the above-mentioned functional units and modules is merely an example for illustration. In actual applications, the as functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units, may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present application. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may dearly understand that, the exemplificative units and steps described in the embodiments disclosed herein be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus/terminal device and method may be implemented in other manners. For example, the above-mentioned apparatus terminal device embodiment it is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented cliff detection method, comprising executing on a processor steps of:
    obtaining a detection distance matrix of distances between a camera of a target robot and a ground within a preset detection angle range collected by the camera;
    obtaining a difference matrix by subtracting a theoretical distance matrix from the detection distance matrix, wherein the theoretical distance matrix is a pre-calculated distance matrix of distances between the camera and a horizontal ground within the detection angle range;
    counting an amount of elements in the difference matrix being greater than a preset first threshold;
    determining a cliff is detected if the counted amount of the elements is greater than a preset second threshold, wherein both the first threshold and the second threshold are positive numbers; and
    controlling the target robot based on determining a cliff is detected.

2. The method of claim 1, wherein before the step of obtaining the difference matrix obtained by subtracting the theoretical distance matrix from the detection distance matrix, the steps further comprise:
    obtaining a height of a center of the camera from the ground and an included angle between an axis of the camera and the ground;
    determining a plurality of sampling angles of the camera within the detection angle range; and
    calculating the theoretical distance matrix according to the height of the center of the camera from the ground, the included angle between the axis of the camera and the ground, and the plurality of sampling angles.

3. The method of claim 1, wherein before the step of counting the amount of the elements in the difference matrix being greater than the preset first threshold, the steps further comprise:
    dot multiplying the difference matrix with a preset coefficient matrix to obtain an adjusted difference matrix, wherein elements in the coefficient matrix are in a 2 one-to-one correspondence with the sampling angles within the detection angle range, and the value of the elements in the coefficient matrix is determined according to the sampling angle corresponding to each of the elements.

4. The method of claim 1, wherein, the controlling step further comprises:
    adjusting a moving speed of the target robot if the counted amount of the elements is less than a preset third threshold, wherein the adjusted moving speed is negatively correlated with the counted amount of the elements; and
    controlling the target robot to stop moving if the counted amount of the elements is greater than or equal to the third threshold.

5. The method of claim 1, wherein the step of obtaining the detection distance matrix of the distance between the camera of the target robot and the ground within the preset detection angle range collected by the camera further comprises:
    obtaining a complete distance matrix of distances between the camera and a front obstacle within an entire visible angle range collected by the camera; and
    selecting a sub-matrix corresponding to the detection angle range as the detection distance matrix.

6. A cliff detection apparatus, comprising a processor and a memory storing instructions executable for by the processor, wherein the instructions comprise:
    a detection distance matrix obtaining module configured to obtain a detection distance matrix of distances between a camera of a target robot and a ground within a preset detection angle range collected by the camera;
    difference matrix calculating module configured to obtain a difference matrix obtained by subtracting a theoretical distance matrix from the detection distance matrix, wherein the theoretical distance matrix is a pre-calculated distance matrix of distances between the camera and a horizontal ground within the detection angle range;
    an element amount counting module configured to count an amount of elements in the difference matrix being greater than a preset first threshold;
    a cliff detecting module configured to determine a cliff is detected if the counted amount of the elements is greater than a preset second threshold, wherein both the first threshold and the second threshold are positive numbers; and
    a robot control module configured to control the target robot based on determining a cliff is detected.

7. The apparatus of claim 6, wherein the instructions further comprise:
    a camera information obtaining module configured to obtain a height of a center of the camera from the ground and an included angle between an axis of the camera and the ground; a sampling angle determining module configured to determine a plurality of sampling angles of the camera within the detection angle range; and
    a theoretical distance matrix calculating module configured to calculate the theoretical distance matrix according to the height of the center of the camera from the ground, the included angle between the axis of the camera and the ground, and the plurality of sampling angles.

8. The apparatus of claim 6, wherein the instructions further comprise:
    a difference matrix adjusting module configured to dot multiply the difference matrix with a preset coefficient matrix to obtain an adjusted difference matrix, wherein elements in the coefficient matrix are in a one-to-one correspondence with the sampling angles within the detection angle range, and the value of the elements in the coefficient matrix is determined according to the sampling angle corresponding to each of the elements.

9. The apparatus of claim 6, wherein the robot control module further comprises:
    a speed adjusting module configure to adjust a moving speed of the target robot if the counted amount of elements is less than a preset third threshold, and in which the adjusted moving speed is negatively correlated with the counted amount of elements; and a braking module configure to control the target robot to stop moving if the counted amount of elements is greater than or equal to the third threshold.

10. The apparatus of claim 6, wherein the detection distance matrix obtaining module further comprises:
a complete distance matrix obtaining unit configured to obtain a complete distance matrix of distances between the camera and a front obstacle within an entire visible angle range collected by the camera; and
a detection distance matrix selecting unit configured to select a sub-matrix corresponding to the detection angle range as the detection distance matrix.

11. A terminal device for cliff detection, comprising:
one or more processors;
a memory; and
one or more programs, wherein the one or more programs are stored in the memory and configured to be executed by the one or more processors, the one or more programs comprise:
instructions for obtaining a detection distance matrix of distances between a camera of a target robot and a ground within a preset detection angle range collected by the camera; instructions for obtaining a difference matrix obtained by subtracting a theoretical distance matrix from the detection distance matrix, wherein the theoretical distance matrix is a pre-calculated distance matrix of distances between the camera and a horizontal ground within the detection angle range;
instructions for counting an amount of elements in the difference matrix being greater than a preset first threshold;
instructions for determining a cliff is detected if the counted amount of the elements is greater than a preset second threshold, wherein both the first threshold and the second threshold are positive numbers, and
instructions for controlling the target robot based on determining a cliff is detected.

12. The terminal device of claim 11, wherein the one or more programs further comprise:
instructions for obtaining a height of a center of the camera from the ground and an included angle between an axis of the camera and the ground;
instructions for determining a plurality of sampling angles of the camera within the detection angle range; and
instructions for calculating the theoretical distance matrix according to the height of the center of the camera from the ground, the included angle between the axis of the s camera and the ground, and the plurality of sampling angles.

13. The terminal device of claim 11, wherein the one or more programs further comprise:
instructions for multiplying the difference matrix with a preset coefficient matrix to obtain an adjusted difference matrix, wherein elements in the coefficient matrix are in a one-to-one correspondence with the sampling angles within the detection angle range, and the value of the elements in the coefficient matrix is determined according to the sampling angle corresponding to each of the elements.

14. The terminal device of claim 11, wherein the one or more programs further comprise:
instructions for dot multiplying the difference matrix with a preset coefficient matrix to obtain an adjusted difference matrix, wherein elements in the coefficient matrix are in a one-to-one correspondence with the sampling angles within the detection angle range, and the value of the elements in the coefficient matrix is determined according to the sampling angle corresponding to each of the elements.

15. The terminal device of claim 11, wherein the instructions for obtaining the detection distance matrix of the distances between the camera of the target robot and the ground within the preset detection angle range collected by the camera comprise:
instructions for obtaining a complete distance matrix of distances between the camera and a front obstacle within an entire visible angle range collected by the camera; and instructions for selecting a sub-matrix corresponding to the detection angle range as the detection distance matrix.

* * * * *